United States Patent
Hamann et al.

(10) Patent No.: US 7,133,254 B2
(45) Date of Patent: Nov. 7, 2006

(54) MAGNETIC RECORDING HEAD WITH HEATING DEVICE

(75) Inventors: Hendrik F. Hamann, Yorktown Heights, NY (US); Chie Ching Poon, San Jose, CA (US); Michael P. Salo, San Jose, CA (US); Hemantha Kumar Wickramasinghe, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 322 days.

(21) Appl. No.: 10/452,553

(22) Filed: May 30, 2003

(65) Prior Publication Data

US 2004/0240109 A1 Dec. 2, 2004

(51) Int. Cl.
*G11B 5/147* (2006.01)
*G11B 5/02* (2006.01)
*G11B 21/02* (2006.01)

(52) U.S. Cl. .................. 360/126; 360/59; 360/128; 360/75

(58) Field of Classification Search .................. 360/59, 360/126, 128, 317, 75, 236.6, 235.8, 119, 360/120, 122
See application file for complete search history.

(56) References Cited

U.S. PATENT DOCUMENTS

| 5,991,113 | A | 11/1999 | Meyer et al. |
| 6,233,206 | B1 | 5/2001 | Hamann et al. |
| 6,493,183 | B1 | 12/2002 | Kasiraj et al. |
| 2003/0099054 | A1* | 5/2003 | Kamijima ..................... 360/59 |
| 2004/0027728 | A1* | 2/2004 | Coffey et al. ................ 360/313 |
| 2004/0190175 | A1* | 9/2004 | Chey et al. ................... 360/59 |
| 2004/0218302 | A1* | 11/2004 | Maat ............................ 360/59 |

FOREIGN PATENT DOCUMENTS

| JP | 2001283404 A | * | 10/2001 |
| JP | 2002133608 A | * | 5/2002 |

* cited by examiner

*Primary Examiner*—William J Klimowicz

(57) ABSTRACT

A magnetic recording disk drive has a magnetic recording head that includes first and second separating layers, and a heater formed between the first and second separating layers. The heater has a dimension such a thermal protrusion is induced in the recording head and a thermal conductance between the recording head and a recording medium is enhanced.

40 Claims, 11 Drawing Sheets

MAGNETIC RECORDING HEAD WITH HEATING DEVICE

BACKGROUND OF THE INVENTION

The present invention relates generally to a magnetic recording head and more particularly to a magnetic recording head that includes a heating device for thermally-induced protrusion (TIP) of the head and thermally-assisted recording (TAR) on a magnetic recording medium.

In recent years storage densities of hard drives have been increasing at a tremendous pace. One of the challenges to improve the storage densities further involves the reduction of the fly height. In magnetic storage a recording head flies via an air-bearing surface over a spinning disk. Current products have fly heights of less than 10 nm. A further reduction with conventional means is limited, at least partly, by the smoothness of the air bearing and magnetic recording disk surfaces.

A solution to this problem is to exploit the thermally-induced protrusion of a part of the recording head. Another possible improvement in storage densities can be achieved by local heating of the disk, by which the coercivity of the media is temporarily reduced. Consequently, magnetic recording can be realized on harder (i.e., higher coercivity) magnetic materials, which will in turn support higher density magnetization patterns.

Although the advantages of thermally-induced protrusion (U.S. Pat. No. 5,991,113) as well as thermally-assisted recording (U.S. Pat. Nos. 6,233,206 and 6,493,183) have been recognized separately, no conventional device has been able to include both features in a head (e.g., in a single magnetic recording head). Therefore, none of the conventional devices have been able to realize the benefits of both TIP and TAR in a single magnetic recording head.

SUMMARY OF THE INVENTION

It is therefore an object of the present invention to provide a heating device and a magnetic head which includes the heating device, which combines the advantages of thermally-induced protrusion and thermally-assisted recording.

Specifically, the present invention includes a heating device for a magnetic recording head. The heating device includes first and second separating layers, and a heater formed between the first and second separating layers, a dimension of the heater being optimized so as to induce a thermal protrusion in the recording head and enhance a thermal conductance between the recording head and a recording medium. For example, the dimension may include a width in a down-track direction.

In addition, a fly height between said recording head and said recording medium is reduced by an amount corresponding to said thermal protrusion.

The present invention also includes a magnetic recording head which includes a write gap, first and second magnetic poles formed on a leading edge side of the write gap, and a heating device formed between the first and second magnetic poles, the heating device inducing a thermal protrusion in the recording head and enhancing a thermal conductance between the recording head and a recording medium. Further, the heating device may include first and second separating layers, and a heater formed between the first and second separating layers, a dimension of the heater being optimized so as to induce a thermal protrusion in the recording head and enhance (e.g., simultaneously) a thermal conductance between the recording head and a recording medium.

The recording head may further include a plurality of terminals (e.g., less than seven terminals) for making an electrical connection to the recording head. Further, a power supply to the heater may be optimized for simultaneous performance of thermally-induced protrusion and thermally-assisted recording.

In another aspect, the magnetic recording head includes a write gap, first and second magnetic poles formed on a leading edge side of the write gap, a first heating device formed between the first and second magnetic poles, the first heating device inducing a thermal protrusion in the recording head, and a second heating device formed between the first and second magnetic poles, the second heating device enhancing a thermal conductance between the recording head and a magnetic disk. Specifically, each of the first and second heating devices may include first and second separating layers, and a heater formed between the first and second separating layers.

The recording head may further include an electrical circuit which connects the first and second heating devices to a power supply. Further, an AC and DC component of the power supply to the circuit may control at least one of the first heating device and the second heating device. Alternatively, a DC component of a power supply to the circuit may control at least one of the first heating device and the second heating device. Alternatively, an AC component of a power supply to the circuit may control at least one of the first heating device and the second heating device. Alternatively, a DC component of a power supply to the circuit may control one of the first heating device and the second heating device. Alternatively, an AC component of a power supply to the circuit may control the first heating device and the second heating device.

In addition, the circuit may include at least one capacitor, at least one lead, and at least one inductor. Further, a frequency of the power supply may control power between the first and second heating devices. In addition, an amplitude of the power supply may be adjusted to adjust a total amount of power to the first and second heaters.

Further, the thermal protrusion may increase the thermal conductance between the recording head and a magnetic disk. In addition, the thermal protrusion may occur at the write gap.

In one aspect, the magnetic head may include a capacitor connected to the first and second heating devices. The capacitor includes first and second plates formed of first and second leads, respectively, and a dielectric material formed between the first and second leads. In this case, the second heating device may be independently controlled with a DC and AC current/voltage, and the first heating device may be controlled with an AC current/voltage. Further, an amount of thermal power may be controlled by adjusting an amplitude of the AC current.

In another aspect, the recording head may include a first capacitor connected in series with the first heating device, and a second capacitor connected in parallel with the second heating device. The recording head may also include five terminals, one of the terminals comprising a heater terminal, and one of the terminals comprising a terminal which is shared between the first heating device and a write coil. Further, one high frequency component may power both of the first and second heating device, and a power division between the first and second heating devices may be primarily determined by an AC power supply frequency.

The present invention also includes a method of magnetic recording which includes heating a portion of a magnetic head so as to both induce a thermal protrusion in the recording head and enhance a thermal conductance between the recording head and a recording medium.

The present invention also includes a hard disk drive including the magnetic recording head. The disk drive includes a spindle for rotating a magnetic disk, and an arm having the magnetic recording head, for selectively locating the magnetic recording head over the magnetic disk.

The present invention thus provides a heating device and a magnetic recording head which combines the advantages of both thermally-induced protrusion and thermally-assisted recording. This allows the present invention to further increase the recording density over conventional devices and methods.

BRIEF DESCRIPTION OF THE DRAWING

The foregoing and other objects, aspects and advantages will be better understood from the following detailed description of a preferred embodiment of the invention with reference to the figures, in which.

DETAILED DESCRIPTION OF THE INVENTION

Figure 1:
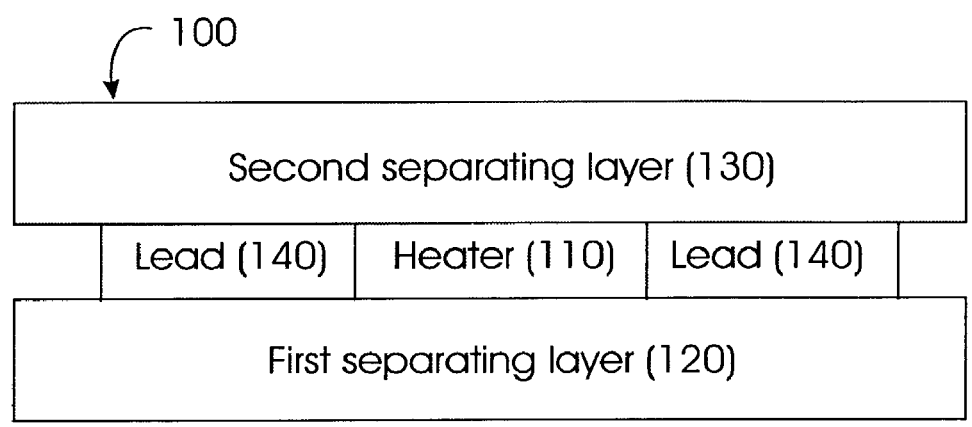
FIG. 1 illustrates a sectional schematic of a heating device 100 according to present invention.

Referring to FIG. 1, the present invention includes a heating device 100 for a magnetic recording head. A dimension (e.g., a length in a down-track direction) of the heating device 100 is selected to induce a thermal protrusion in the recording head (and thereby lower the fly height of the recording head), and to increase the temperature in the recording medium (thereby reducing the coercivity of the medium). The thermally-induced protrusion increases the thermal conductance between the recording head and the recording medium. In other words, the heating device 100 may be used for both thermally-induced protrusion and thermally-assisted recording in a magnetic head.

For purposes of this application, the term "width" will refer to a dimension in an across track direction, the term "height" will refer to a dimension in a direction away from the air bearing surface (ABS) of the magnetic head, and the term "thickness" will refer to a dimension in a down-track direction.

A single heater circuit embedded properly in the recording head can be used for both fly height reduction (TIP) as well as disk heating (TAR). In addition, it has been found experimentally that the simultaneous use of TIP and TAR improves the TAR significantly.

The present invention is significant for at least the following reasons:

1) Since recording sliders have to be very small, the number of connector terminals on the deposited end of the magnetic slider (i.e., connections to the arm electronics via the suspension) is limited severely. Current technology uses four connector terminals, two for the write coil (i.e., for recording) and two for the magneto-resistive/giant magneto-resistive (MR/GMR) sensor (i.e., for reading data), to connect to the arm electronics (preamplifier etc.). The addition of four more terminals (two for TIP and two for TAR, which results into a total of eight terminals) is a major technical challenge besides the fact that it will add to the cost of a recording head. This invention describes solutions to realize TAR and TIP with fewer (e.g., only one or two) additional terminals (e.g., a total of five or six).

2) It has been discovered that possible improvements by TAR and TIP are not simply additive. In fact, TAR can be greatly enhanced by TIP. Specifically, by reducing the fly height via thermal protrusion the thermal conductance between a recording head and the medium can be increased, improving TAR.

In addition, the heating used for TIP can increase the temperature bias between head and medium (e.g., the disk), further enhancing the ability to heat the disk. Thus there are significant improvements by combining TAR and TIP in a single magnetic recording head.

The present invention includes embodiments to realize TAR and TIP with a single heater circuit and just one or two additional terminals. One of the complications for using the same heater for TIP and TAR lies in the fact that the requirements are somewhat different.

For instance, for TIP it is preferred to heat over large distances of the recording slider because the protrusion is determined (to a first order neglecting stress and strain) by the integral of temperature over the distance. For example, a 100 K temperature increase over a distance of 1 μm results approximately in the same protrusion as 1 K over a distance of 100 μm. Since lower temperatures are generally beneficial in terms of stress and stray heating of other temperature sensitive components of the recording head (e.g., a magnetic sensor such as magneto-resistive (MR) sensor), TIP heaters are designed to be large resulting in large heat spots (e.g., larger than 20 μm) by which a lot of protrusion can be obtained with a small temperature rise.

TAR requires a large temperature bias across the gap between recording head and the disk, by which power can flow from the heating device in the recording head to the disk and heat consequently the magnetic layer on the disk. Typically, for TAR a much smaller heating device is required which can locally provide a large enough temperature difference between the disk and head.

In one aspect, a heating device has a dimension selected to provide both thermally-induced protrusion (TIP) and thermally-assisted recording (TAR) in a magnetic head.

Specifically, as shown in FIG. 1, the heating device 100 includes first and second separating layers (120 and 130, respectively), a heater (e.g., heating element) 110 formed between the first and second separating layers as well as leads 140.

In another aspect, a recording head includes the heating device and, therefore, includes the advantages of combined usage of TIP and TAR. Specifically, the recording head includes a heating device having an optimum size heater so as to make the recording head capable of inducing thermal protrusion of the recording head and thereby improving the thermal conductance between recording head and disk and capable of heating the recording media.

Figure 2:
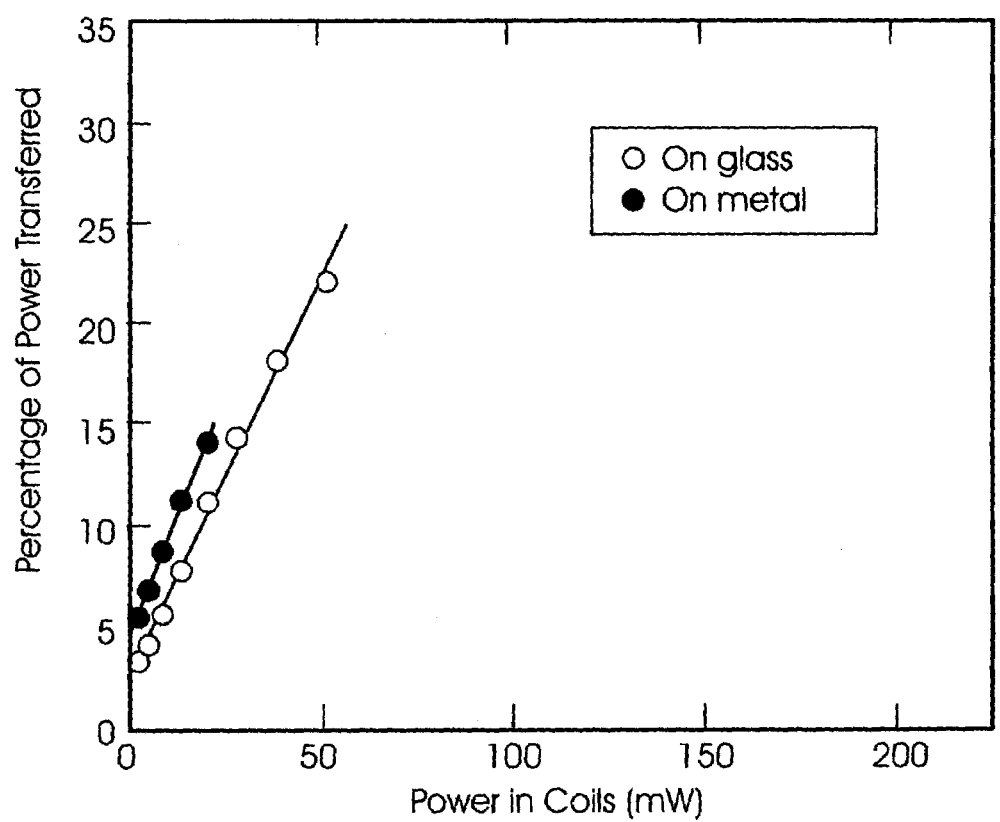
FIG. 2 is a graph of percentage power transferred to the disk from the magnetic sensor (MR) as a function of power in the coil that provides heating/protrusion.

FIG. 2 is a graph which illustrates thermal loading percentage of power transferred from head to disk, i.e., thermal loading, for both glass and metal disk substrates as a function of power in the coils which results in heating and head protrusion. Specifically, in FIG. 2, the fraction of power transferred from a magneto-resistive (MR) stripe to a disk is plotted vs. the power dissipated in the coils (which is proportional to coil-induced protrusion).

In this experiment the MR stripe mimics a heater device and by measuring the ratio of thermal resistances on and off the disk the fraction of the power transferred to the disk can be inferred. FIG. 2 shows that the percentage of power transferred to the disk is increased quite dramatically as the head flies closer to the disk as a result of protrusion produced by the heated coil.

FIG. 2 shows that with zero power dissipated in the coils (e.g., zero coil-induced protrusion) only 2.5% of power of the MR stripe is transferred to the glass disk. However, as about 20 mW of power in the coils is dissipated, which translates to about 40 Å protrusion, the portion of power of the MR stripe transferred to the disk goes up to about 12%.

For example, if 10 mW of power is dissipated in the MR stripe at zero protrusion (0 mW in coils), 0.3 mW of power flows from the MR stripe into the disk. However, 1.2 mW of power flows into the disk at about 40 Å protrusion with 20 mW in coils, which will increase the amount of heating of the disk by about a factor of 4.

This improvement in thermal coupling is most likely not solely due to the fact that recording head and heating device (e.g., the MR stripe) are flying closer. It is more probable that the thermal conductance between head and disk is also enhanced by the increased pressure under the protruded part of the recording head.

Specifically, FIG. 2 illustrates the percentage of transferred power to the disk vs. power dissipated in the coils for a glass (e.g., 75 nm magnetic film/glass substrate) and metal disk (e.g., 75 nm magnetic film/10 μm NiP/AlMg substrate) for a different head. As shown in FIG. 2, more power is transferred to the metal disk, which indicates heating. In addition, the heating for TIP will improve the temperature bias between head and disk and, therefore, improve the power flow from the head in the disk.

General design guidelines can be implemented to provide a dual capability of a heater in a recording head (i.e., to thermally-induce head protrusion and to thermally-assist the recording). The following designs serve only as examples to illustrate the idea of this aspect of the present invention, and in no way should be considered as limiting the design of the invention.

Figure 3A:
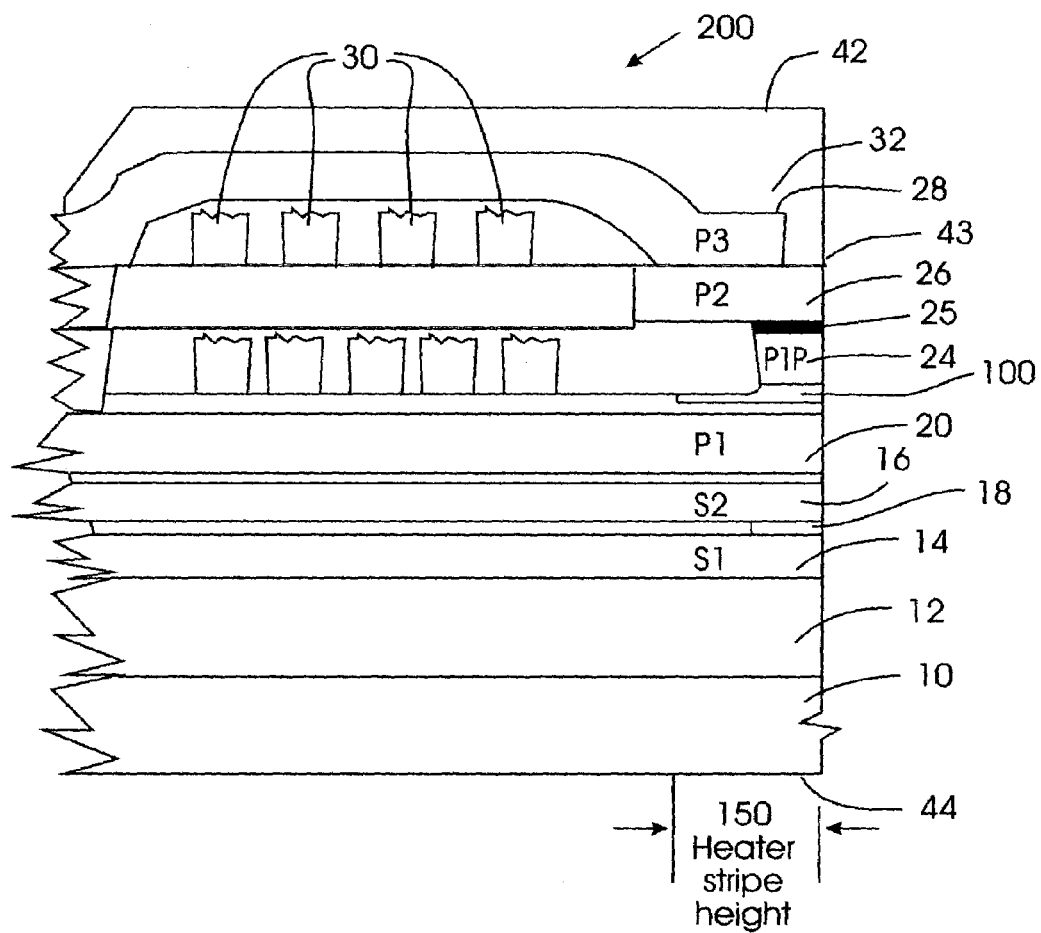
FIG. 3A is a side sectional view of an air-bearing slider with a magnetic head 200 according to the present invention.
Figure 3B:
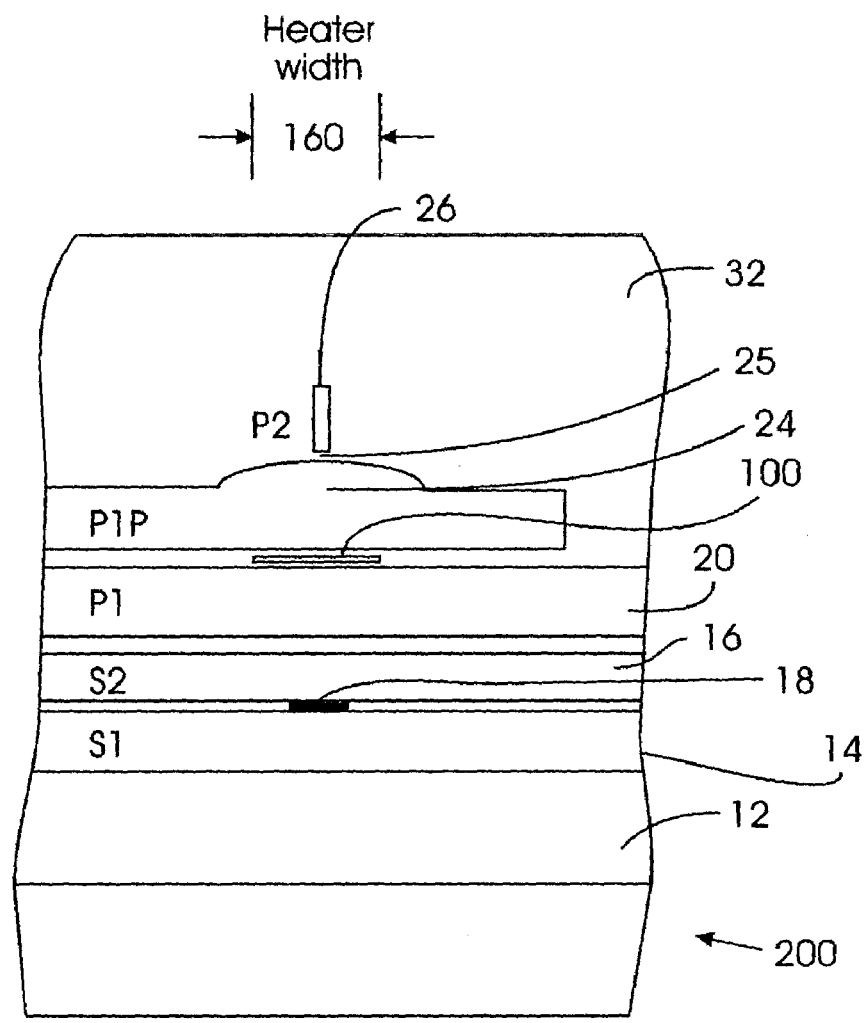
FIG. 3B is a view from the air-bearing surface (ABS) of an air-bearing slider with the magnetic head 200 according to the present invention.

FIG. 3A illustrates a magnetic head 200 having a heater 110 suitable for TAR and TIP, according to the present invention. Specifically, the recording head 200 includes a heating device 100 (FIG. 1). Further, the recording head may include just two additional terminals for a total of six terminals. FIG. 3B illustrates an air-bearing surface (e.g., ABS) view of the recording head 200 with heating device 100 suitable for TAR and TIP, according to the present invention.

Specifically, as shown in FIGS. 3A–3B, the recording head 200 may include an air-bearing surface 43, a leading edge side 44 and trailing edge side 42. The recording head 200 also includes substrate (e.g., the slider which is typically formed of an alumina-titanium carbide composite ceramic material) 10, undercoat (e.g, alumina) 12, shields $S_1$ 14, $S_2$ 16, a magnetic sensor (e.g., magneto-resistive (MR) sensor) 18, magnetic pole $P_1$ 20, and a heating device 100 suitable for TIP and TAR. The heater 100 is shown with a stripe height 150 in FIG. 3A and a width 160 in FIG. 3B.

As shown in FIGS. 3A–3B, the heating device 100 is located between magnetic pole $P_1$ 20 on one side, and magnetic pole $P_{1P}$ 24, write gap 25, magnetic poles $P_2$ 26, $P_3$ 28, the coils 30 and the overcoat (e.g., alumina) 32 on another side. The poles $P_1$ 20 and $P_{1P}$ 24 are members of the first magnetic pole layer and the poles $P_2$ and $P_3$ are members of the second magnetic pole layer.

For the heating device 100 to be suitable for TIP and TAR, it is important to understand thermally-induced protrusion and thermally-assisted recording.

Typically, for a range of fly heights, a heating device suitable for TIP should be able to generate protrusions of between about 40 Å and 120 Å, typically about 80 Å for a fly height of 120 Å. The protrusion should occur at the write gap 25 located between the write poles ($P_{1P}$ and $P_2$). In certain cases, protrusion is also needed for the magnetic sensor, in which case the heating device is preferably located between the sensor (e.g., MR sensor) and write gap. Although it is understood that the extent of the protrusion over the recording head matters, for simplicity, these effects will be neglected.

A heater suitable for TIP and TAR should be able to heat the disk up to a given target temperature without compromising (e.g., due to stray adjacent track heating) the stability of the neighboring data tracks. For example, assume a design point of 80° C. For such a design point, adjacent track heating should be a minor issue and for simplicity this effect will be neglected. It is also noted that it is desirable to heat the disk to a maximum temperature at the write gap (e.g., between magnetic pole $P_1$ and magnetic pole $P_2$) (e.g., as explained below) to synchronize the thermally-assisted recording process.

In addition to these features, it is generally desired:

1) to obtain the largest TIP and TAR effect for a given heater temperature in order to avoid stray heating of other elements in the recording head and in order to ensure a long heater lifetime;

2) to minimize "stray" heating of the sensor (e.g., magneto-resistive/giant magneto-resistive sensor) 18, which could affect the read performance of the recording head;

3) to minimize stray heating of magnetic pole $P_2$ 26, in order to avoid a reduction of the magnetization and thus of the available write field; and 4) to minimize disturbance to the magnetic circuit, which could reduce the available write field.

Heater Temperature for TIP

The resulting protrusions as a function of heater size have been estimated using thermo-mechanical finite element modeling. The parameters for the calculations have been taken from IEEE Transactions on Magnetics 38, 101 (2002). The recording head dimensions chosen in the calculations are the dimensions of a conventional recording head.

Figure 3C:
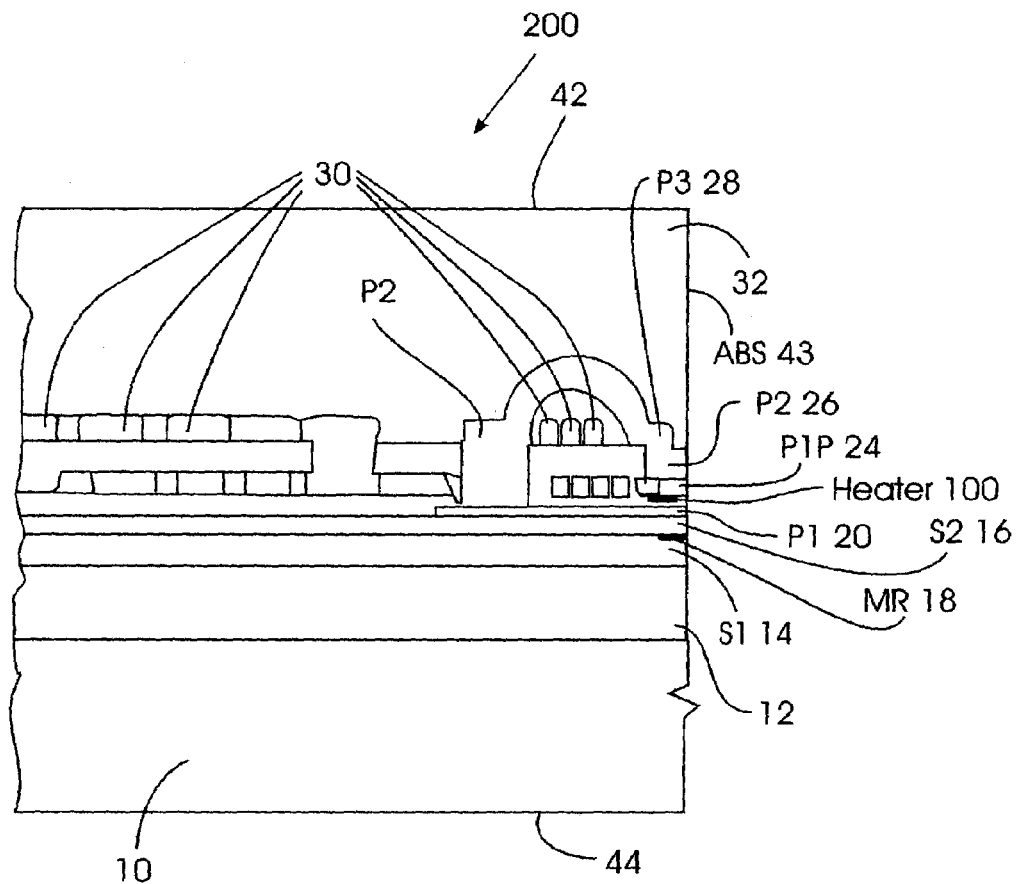
FIG. 3C is a line drawing made from a scanning electron microscope (SEM) micrograph of an exemplary embodiment of the magnetic head 200 according to the present invention.
Figure 3D:
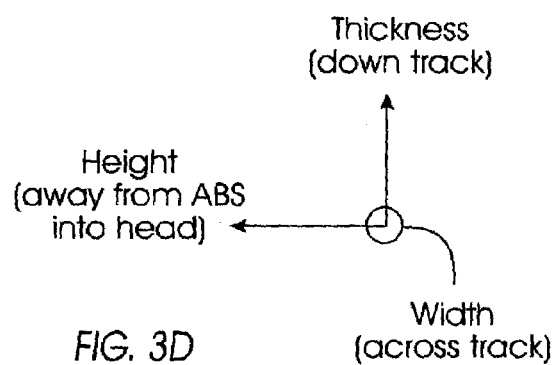
FIG. 3D indicates the convention for the direction that indicates the thickness, height or width of a dimension for FIG. 3C according to the present invention.

FIG. 3C is a line drawing of a scanning electron microscope (SEM) photo of an exemplary embodiment of the recording head 200. The convention for the direction that indicates the thickness, height or width of a dimension is shown in FIG. 3D. In this embodiment, for example, the recording head 200 may include a substrate which is about 1 mm wide, about 1.2 mm thick and about 0.3 mm high, an undercoat 12 which may include an alumina (e.g., AlOx) layer which is about 1 mm wide, about 3 μm thick and about 0.3 mm high, a shield layer $S_1$ 14 which may include a NiFe layer which is about 200 μm wide, about 2 μm thick and about 150 μm high, and a shield layer $S_2$ 16 which is about 100 μm wide, about 1 μm thick and about 50 μm high.

This embodiment of the recording head 200 may also include a magnetic pole $P_1$ 20 which may include high-moment NiFe (HM-NiFe) which is about 27 μm wide, about 1 μm thick and about 21 μm high, the heater 110, which is part of the heating device 100 (FIG. 1), magnetic pole $P_{1P}$ 24 which may include HM-NiFe which is about 27 μm wide, about 1.5 μm thick and about 2 μm high, magnetic pole $P_2$ 26 which may include HM-NiFe which at the ABS side is about 2 μm wide and about 1 μm thick, and magnetic pole $P_3$ 28 which may include HM-NiFe, and overcoat 32 which may include alumina (e.g., AlOx) which is about 1 mm wide, about 15 μm thick, and about 0.3 mm high. FIG. 3C also illustrates the air-bearing surface 43, leading edge side 44 and trailing edge side 42 in this embodiment.

In this embodiment, for example, the heating device 100 may be located between magnetic poles $P_1$ 20 and $P_{1P}$ 24. The heating device 100 may include separating layers (e.g., alumina) 120, 130 each having a thickness of about 60 nm. In addition, the heater (e.g., heating element) 110 may be thin (e.g., less than 50 nm).

For a smaller size heater 110 (e.g., 1 μm×1 μm (width 160×stripe height 150)), finite element modeling yields about 3 Å/mW protrusion for a typical recording head while for a larger size heater 110 (10 μm×10 μm (width×stripe height)) finite element modeling yields only about 1.7 Å/mW.

At first glance, a heater size dependence of the protrusion per unit power would not be expected. However, since a smaller heater 110 may preferentially heat materials with larger expansion coefficients, a smaller increase in protrusion for a decreasing heater size may be observed. In combination with a target of 80 Å protrusion control, a desired power (e.g., the required power) of about 27 mW for a small heater 110 (1×1 μm²) and about 47 mW for a large heater (10×10 μm²) can be readily determined.

Again using finite element methods, the resulting temperature in the heater which is necessary for realizing 80 Å protrusion control, can be estimated. The calculations yield, under flying conditions for the small heater (1×1 μm²), about 30 K/mW while for the larger heater (10×10 μm²), the calculations yield about 3 K/mW. This means that for 80 Å protrusion control, a 810 K temperature rise for a 1×1 μm² heater (e.g., about 27 mW) may be used, and only 141 K temperature rise for a 10×10 μm² heater (about 54 mW) may be used.

Figure 4:
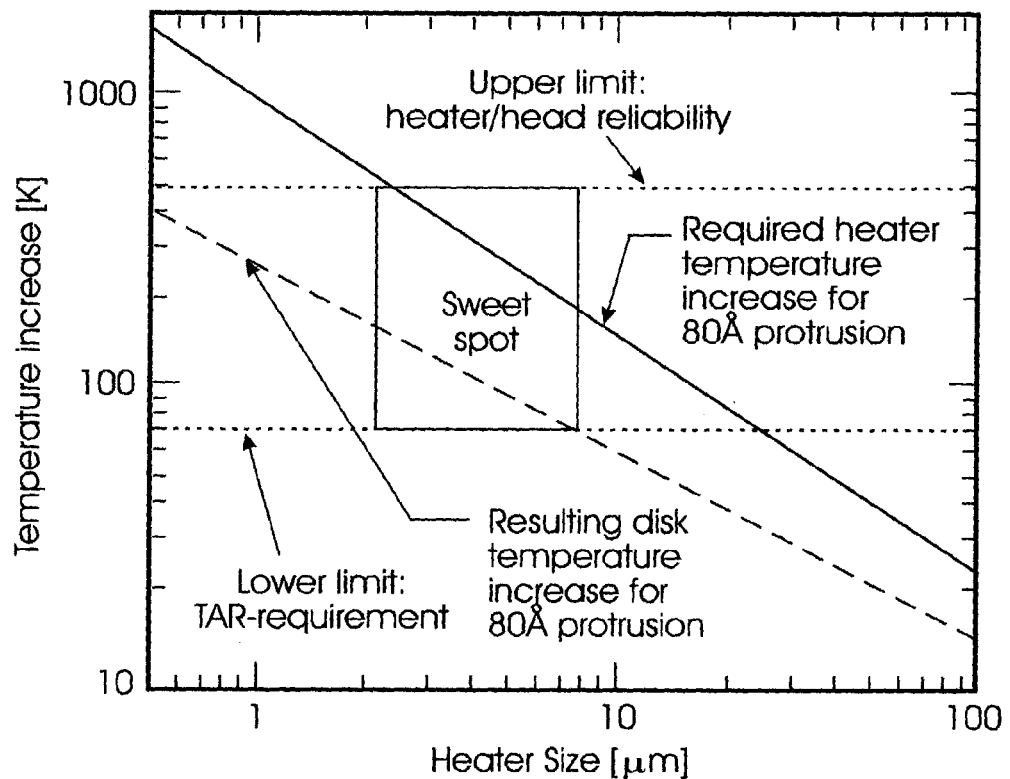
FIG. 4 is a graph of temperature increase for the recording head according the present invention as a function of heater size.

FIG. 4 is a graph showing a heater temperature increase (e.g., required heater temperature rise) for 80 Å protrusion as a function of the size of the heater 110. Heater 110 is assumed to be square. As shown in FIG. 4, the larger the heater 110, the lower the heater temperature rise that is required. Thus, if the heater 110 is only used for TIP, a larger heater 110 is clearly preferred as long as the time response of the heater 110 is a non-issue. Typically, TIP heaters are required to be turned on in 1–2 ms (e.g., during a seek time of the recording head), which limits the size of the heater 110 to something below 100×100 μm².

Resulting Disk Temperature

The temperature of the heater 110 may be used to estimate a resulting disk temperature. Clearly, with required decreasing temperatures in the heater (e.g., as the size of the heater 110 is increased for 80 Å protrusion), less temperature bias will be provided between the head and disk, greatly diminishing the disk heating. However, somewhat compensating for this effect, with increasing heater size, comes an increase in the dwell time of the portion of the disk which is exposed to the heated area. In a transient regime (e.g., dwell time is faster than inverse of thermal frequency) the disk temperature may be increased approximately with the square root of the heater size.

FIG. 4 illustrates the estimated disk temperature for 80 Å protrusion as a function of heater size. Specifically, above heater sizes of 7.2×7.2 μm², the resulting disk temperature may be generally too low. On the other hand, as the size of the heater 110 becomes smaller than 2.8×2.8 μm², the required heater temperature may be too high to ensure stable operation of the heating device 100 over an extended amount of time.

In summary, FIG. 4 illustrates some of the issues involved with the present invention. Clearly, each design point will translate into a slightly different optimum heater size range and the above discussion is only meant as an illustrative example. At this point it should be noted that, both dimensions of the heater 110 (e.g., heater stripe height and heater width) have been scaled at the same time. The heat spot dimension in a down-track direction is more important for TAR, especially at high linear speeds.

In another aspect of the present invention, the recording head 200 may include a two terminal heater with additional (e.g., two additional) terminals (e.g., a total of six terminals), where a high frequency component of the supplied power controls both the TAR and TIP parts of the heater circuit and a D.C. component of the supplied power control either the TIP part of the heater circuit or the TAR part of the heater circuit.

It may be desirable in a general application, for the TIP and TAR heater(s) to be independently controlled. For example, one may wish to control the amount of protrusion in TIP during a TAR write operation. Excessive protrusion can cause undesirable head disk interaction and insufficient protrusion inhibits writing data onto the magnetic medium.

Figure 5A:
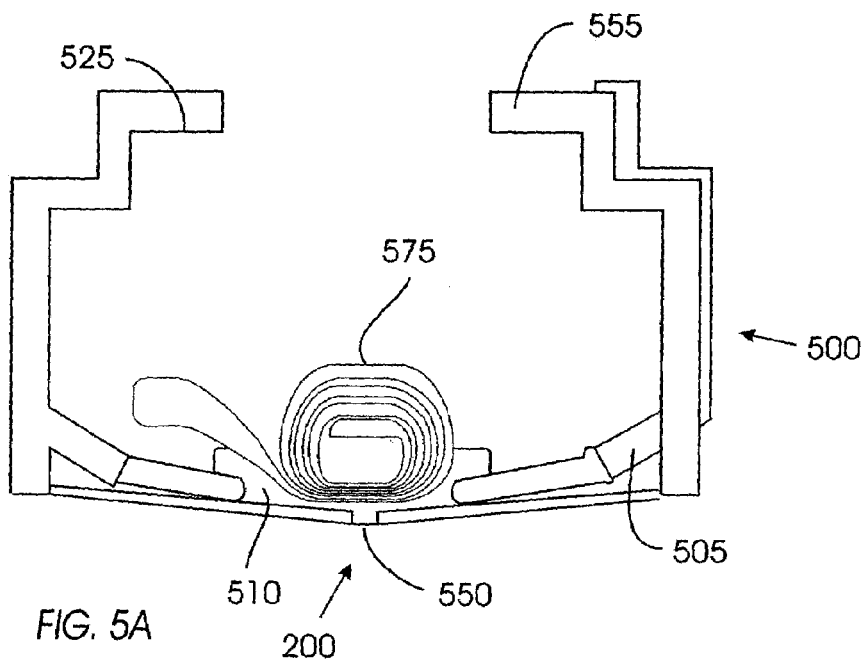
FIGS. 5A–5C illustrate another aspect of the magnetic recording head 200 (e.g., with six terminals) according the present invention.

FIG. 5A illustrates an exemplary embodiment of a possible circuit 500, which is part of the magnetic recording head 200 having a possible arrangement which realizes the independent control of TAR and TIP with only two additional terminals. Specifically, as shown in FIG. 5A, the circuit 500 may include at least one TIP heater 510, at least one TAR heater 550 and a write coil 575. The circuit 200 may also include a lead (e.g., heater lead) 555 which is connected to TAR heater 550 and forms part of a capacitance, a lead 505 connected to the TIP heater 510 and forms a capacitance, and a lead 525 which is connected to both the TIP heater 510 and the TAR heater 550.

Further, the TAR heater 550 may be connected (e.g., directly) to the connector terminals while the TIP heater 510 may be coupled capacitively to one of the terminals. The capacitor may be formed by superimposing two leads which are separated by a thin film of dielectric material such as alumina (e.g., as used in head manufacturing). The TIP heater 510 and TAR heater 550 may share the same ground. Further, when a DC current/voltage is supplied to the connector terminals, the TAR heater 550 may be powered appropriately.

For the TIP part of the recording head, the capacitor of capacitance, $C_{tip}$, composed of the TIP leads in series with the electrical resistance of the TIP heater, $R_{tip}$, forms a high pass filter. Any AC electrical current/voltage of frequency $f=1/(2\pi R_{tip} C_{tip})$ or higher passes through and powers the TIP resistor. The amount of protrusion can therefore be controlled by adjusting the amplitude of the AC current.

Further, the roles of the DC/AC for the TAR and the TIP heaters can be interchanged if so desired. This DC/AC power scheme is shown, for example, in FIG. 5B which is a schematic of the circuit, which is embedded in a recording head 200 having a 6-terminal (e.g., 6 connector pad) recording head (e.g., magnetic slider) with AC and DC powered heaters. Power adjustment may be effected by controlling the DC and AC voltage levels.

Figure 5B:
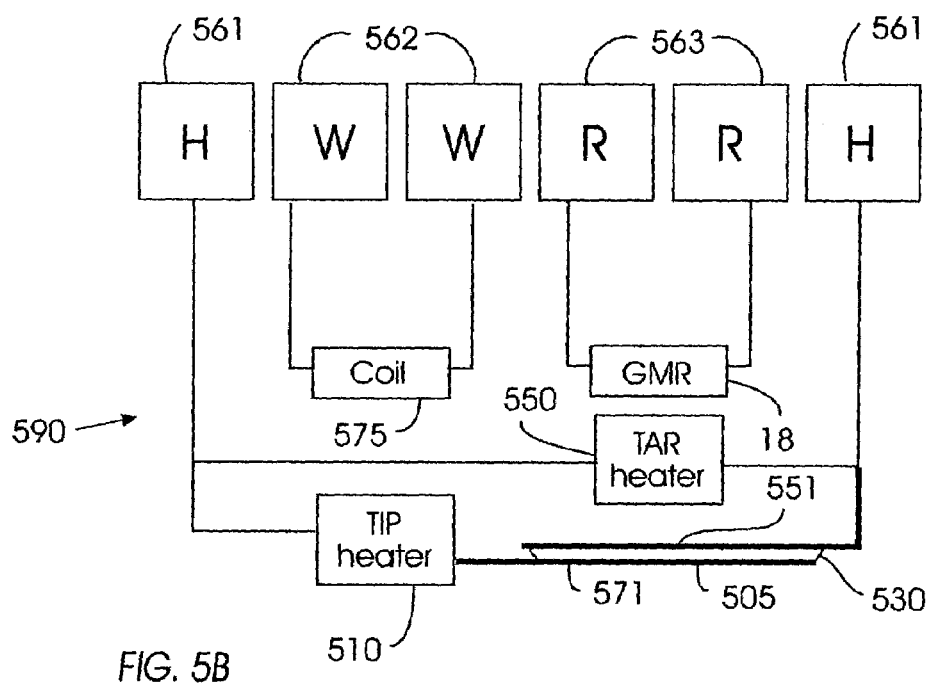

Specifically, the recording head illustrated in FIG. 5B may include heater terminals 561, write coil terminals 562, and read sensor terminals 563. The head may also include a TIP heater 510 (e.g., AC powered), a TAR heater 550 (e.g., DC/AC powered), a write coil 575 and a magnetic sensor (e.g., GMR) 18. In addition, the recording head includes a capacitor 571 which is formed by a lead 505 and lead 551, which are separated by a dielectric (e.g., thin film insulator such as alumina) 530.

To determine if this capacitor arrangement is practical and compatible with normal thin film techniques in the processing of magnetic recording heads, the capacitance of a capacitor can be estimated to be given as $C = \epsilon_0 \epsilon_r A/l$, where $\epsilon_0$ is the permittivity of free space ($8.85 \times 10^{-12}$ F/m), $\epsilon_r$ is the dielectric constant of the material between the two leads that form the capacitor, A is the common area of the two leads, and l is the spacing of the two leads. For example, if the overlap of the leads 505, 551 is 200 microns long by 10 microns wide and spaced by insulator (e.g., alumina ($\epsilon_r=10$)) 10 nm thick, a capacitance may be given as $C=1.77 \times 10^{-11}$ F and a minimum frequency to power the TIP heater 510 (250 Ω resistance) may be given as $f=36.0$ MHz.

The above quantities for the lead dimensions (200 microns×10 microns) and dielectric thickness (10 nm) are all practical values that can be obtained. Thus, the TAR heater 550 can be controlled (e.g., independently controlled) with a DC and AC current/voltage, while the TIP heater 510 may be controlled (e.g., solely controlled) with an AC current/voltage.

There are other schemes besides the one shown in FIGS. 5A–5B which can be easily realized, within the scope of the present invention. While the above discussion is only one example of how such an AC/DC power control can be used to regulate independently the TIP and TAR heaters, it should be noted that improved designs may include, for example, other features such as inductors connected in series with TAR heater 550, etc., to block the AC coming to the TAR heater 550.

Figure 5C:
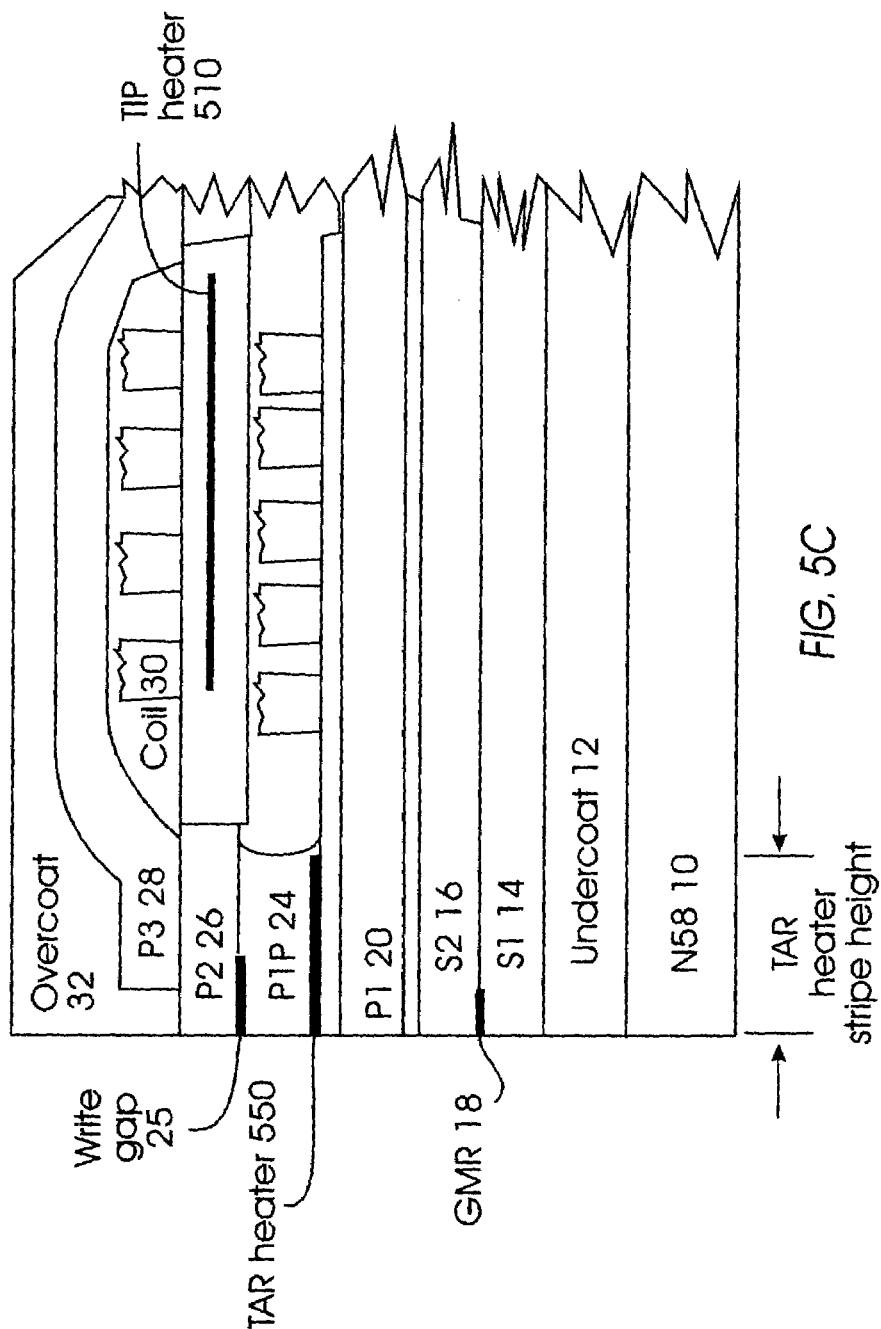

FIG. 5C illustrates how the circuit 500 with the two heaters can be integrated in the recording head. The TAR heater 550 is smaller and located under $P_{1P}$ 24 close to the air-bearing surface while the TIP heater 510 is larger and located behind $P_2$ 26 and between the coils 30 in the region filled with a dielectric material such as alumina. Locating the TIP heater 510 within this dielectric matrix provides a convenient means to construct a heating device with two separating layers, such as shown in FIG. 1.

In another aspect of the present invention, the recording head 200 includes a two terminal heating device, one of the two terminals being shared with one of the write coil terminals (e.g., a total of five terminals), where one high frequency component powers both the TIP heater 510 and the TAR heater 550. The power division between the heaters may be determined by several parameters but may be principally determined by the frequency.

Specifically, the present invention includes arrangement for separate TIP and TAR heaters, where both heaters can be controlled by an AC power control. As an additional advantage, this configuration may use only one additional terminal. For a recording head (e.g., magnetic slider) having a read sensor (e.g., two terminals) and a write coil (e.g., two terminals), this means only a total of five terminals are needed. This arrangement can alleviate difficulty in the fabrication of recording heads where "real estate" at the deposited end of the recording head becomes less and less available as the recording head becomes smaller and smaller.

Figure 6A:
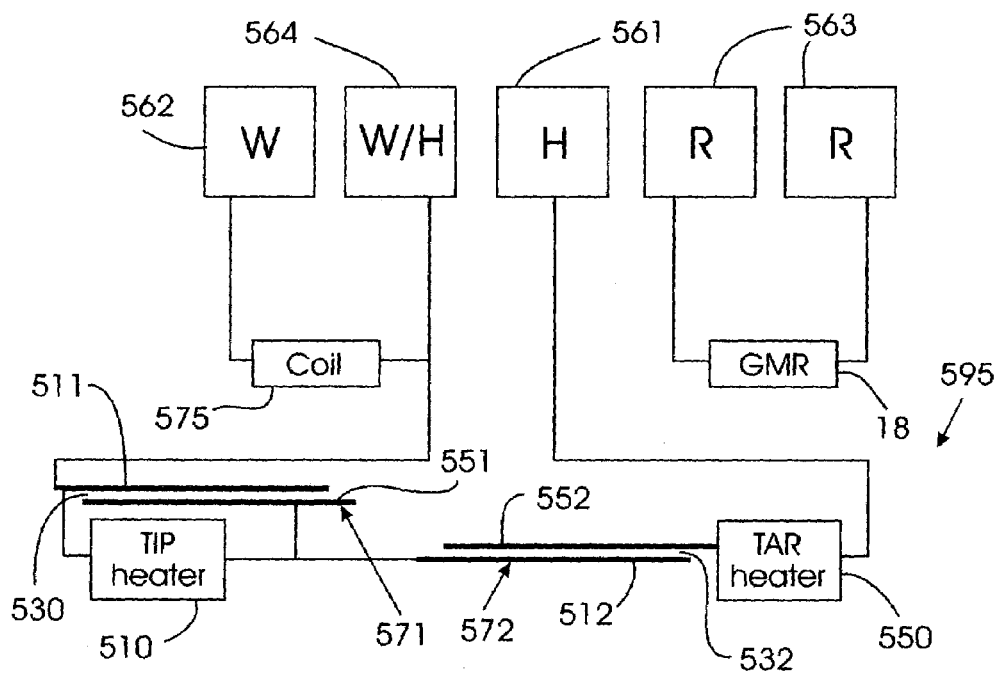
FIGS. 6A–6B illustrate another aspect of the magnetic recording head 200 (e.g., with five terminals) according the present invention.
Figure 6B:
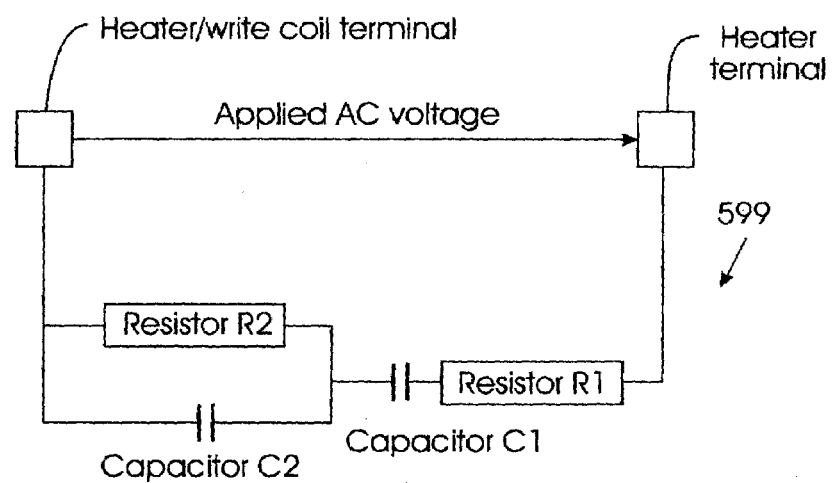

FIG. 6A is a schematic illustration of a circuit which can be implemented in a 5-terminal recording head (e.g., magnetic slider) with AC powered heater(s) and FIG. 6B illustrates a circuit commonly referred to as a Wien's bridge. For example, the Wien's bridge can be used to provide power to the two heaters (e.g,. TIP and TAR heaters).

Specifically, as shown in FIG. 6A, this embodiment of a circuit of the recording head 200 may include a heater terminal 561, a write coil terminal 562, read sensor terminals 563 and a terminal 564 shared by the write coil and the heaters. The head may also include a TIP heater 510 (e.g., AC powered), a TAR heater 550 (e.g., AC powered), a write coil 575 and sensor (e.g., GMR) 18. In addition, the recording head may include first and second capacitors 571, 572 which are formed by leads separated by a thin film insulator such as alumina. Specifically, a first capacitor 572 is formed by a lead 512 and lead 552, which are separated by a dielectric (e.g., thin film insulator such as alumina) 532, and a second capacitor 571 is formed by a lead 511 and lead 551, which are separated by a dielectric (e.g., thin film insulator (e.g., alumina)) 530.

For example, FIG. 6B illustrates a equivalent heater circuit diagram which may be used to understand the operation of this exemplary embodiment. For example, assume that R1 is the TAR heater 550 and R2 is the TIP heater 510. In this configuration both the TAR and the TIP heaters are AC coupled to the terminal such that only AC power of the appropriate frequency can pass through. The ratio of the power supplied to the two heaters (e.g., TIP heater 510 and TAR heater 550) is determined by the AC frequency of the power supply.

Figure 7:
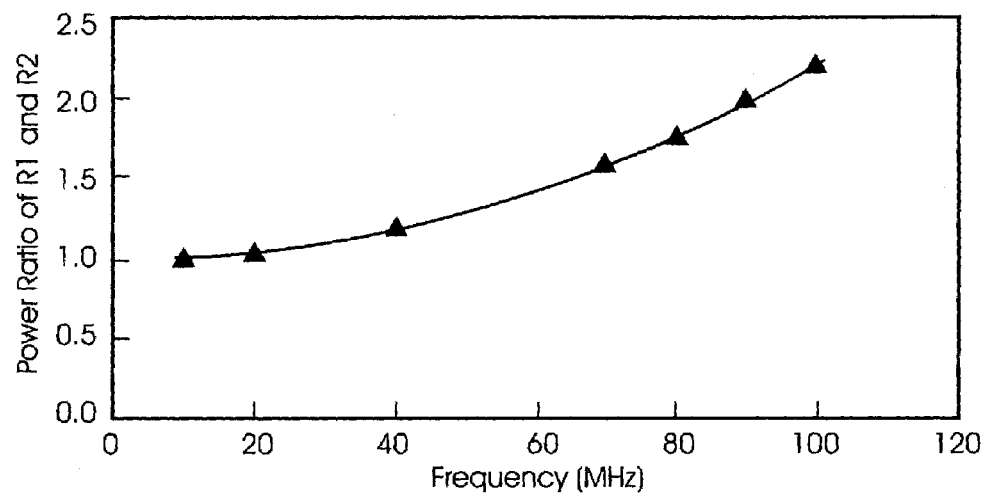
FIG. 7 is a graph showing the power ratio as a function of the frequency for the heating devices in the recording head according the present invention.
Figure 8:
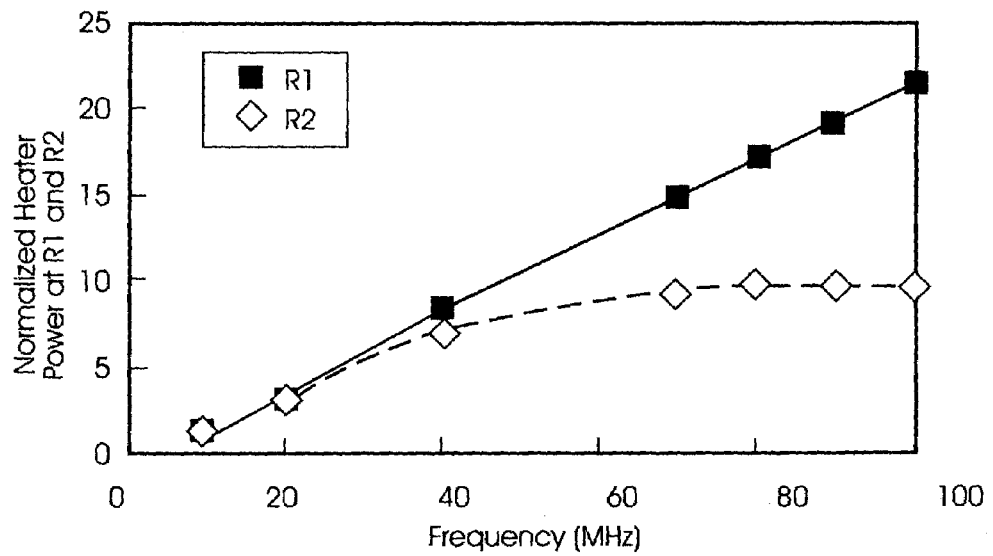
FIG. 8 is a graph plotting normalized power at the heaters as a function of frequency in the recording head according the present invention.

FIG. 7 is a graph which illustrates the power ratio for resistors R1 and R2 as a function of frequency for a Wien's bridge circuit shown in FIG. 6B. Specifically, in FIG. 7, the power ratio for resistors R1 and R2 is plotted for an AC amplitude of 1 volt, 100 ohms heater resistance and a lead capacitance $1.77 \times 10^{-11}$ F (as calculated above). FIG. 8 is a graph illustrating the normalized heater power at R1 and R2 as a function of frequency. Specifically, FIG. 8 shows the normalized power variation at R1 and R2 due to frequency change. The normalization puts the power to be unity at 10 MHz.

It can be inferred from FIGS. 7 and 8 that the power supplied to the two heaters can be selected appropriately by controlling the AC amplitude and frequency. For example, if 30 mW and 17 mW are desired for the TAR and TIP heaters (respectively), the power ratio may be given as 30/17=1.76 which is near 80 MHz. At 1 volt supply the TAR heater (e.g., R1 in this example) has about 1 mW power. Therefore, the AC amplitude required may be SQRT (30/1)=5.5 volts or 3.9 volts RMS. If it is desired to change the TIP heater power to 19 mW, the power ratio may be given as 30/19=1.6 which is near 70 MHz. At 1 volt supply the TAR heater has 0.87 mW. Therefore the AC amplitude required may be SQRT (30/0.87)=5.9 volts or 4.2 volts RMS. Thus, the power to the two heaters can be controlled separately.

The present invention also includes a recording method that combines thermally-induced protrusion and thermally-assisted recording. Specifically, the method includes heating a portion of a magnetic head (e.g., a magnetic pole or portion of the air-bearing surface of the recording head which is on a leading edge side of a write gap in the magnetic head) so as to both induce a thermal protrusion in the recording head and enhance a thermal conductance between the recording head and a recording medium. Specifically, the thermal protrusion may occur at the write gap in the recording head.

Figure 9:
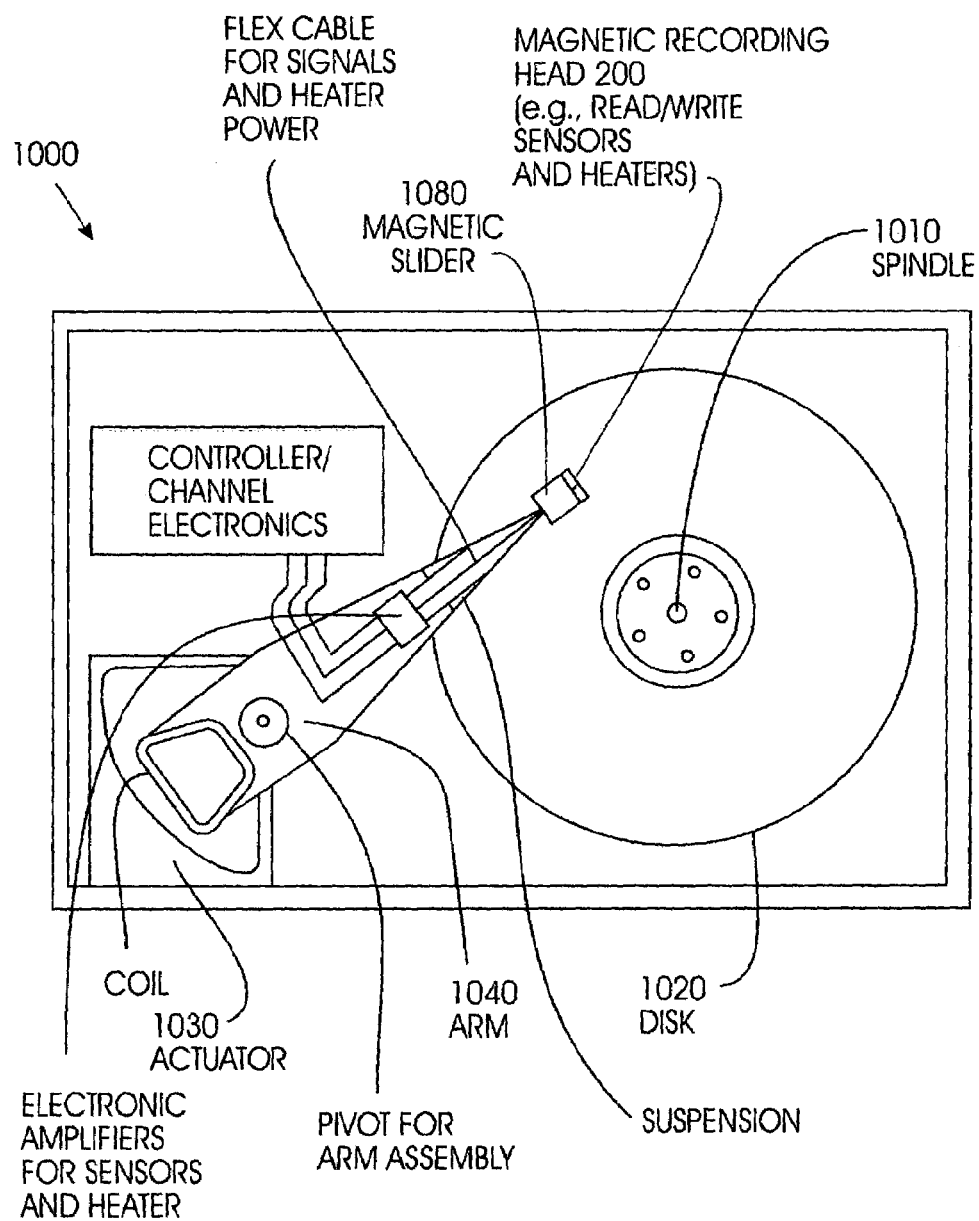
FIG. 9 illustrates a disk drive 1000 which includes the recording head according to the present invention.

As shown in FIG. 9, the present invention also includes hard disk drive 1000 including the magnetic head according to the present invention. The apparatus 1000 includes a spindle 1010 for rotating a magnetic disk 1020, and an arm (e.g., suspension arm 1040) having the magnetic head 200, which is part of the slider 1080, formed thereon. The arm may selectively locate the magnetic head 200 over the magnetic disk 1020, for reading data from the magnetic disk 1020, and writing (e.g., using thermally assisted recording) data to the magnetic disk 1020.

More specifically, in the apparatus 1000 of the present invention, a magnetic disk 1020 for storing data may be located on a spindle 1010. A head actuator 1030 may move a suspension arm 1040 (e.g,. read/write arm) over the surface of the magnetic disk 1020.

Further, a magnetic head 200 may be disposed on (e.g., near the end of) the suspension arm 1040. The magnetic disk 1020 is spun by the spindle while the head actuator 1030 aligns the head 200 with the tracks that lie in concentric circles on the surface of the magnetic disk 1020. The air-bearing surface (ABS) of the slider 1080 is caused to slide closely over the surface of the magnetic disk 1020.

The present invention thus provides a heating device and a magnetic recording head which combines the advantages of both thermally-induced protrusion and thermally-assisted recording. This allows the present invention to further increase the recording density over conventional devices and methods.

While the invention has been described in terms of preferred embodiments, those skilled in the art will recognize that the invention can be practiced with modification within the spirit and scope of the appended claims. For example, although the term "disk" is used herein, this should not be considered as limiting the shape of the medium on which the magnetic head may be used for recording. In addition, although the terms "magnetic" medium and "magnetic" disk are used herein, these terms should be used in their broadest sense. For example, these terms should interpreted to include other forms of recording media (e.g., ferroelectric media) in addition to ferromagnetic recording media.

What is claimed is:

1. A heating device for a magnetic recording head, said heating device comprising:
    first and second separating layers;
    a heater formed between said first and second separating layers, a dimension of said heater being selected to induce a thermal protrusion in said recording head and increase a temperature on a recording medium;
    a power supply for supplying power to said heater; and
    an electrical circuit which connects said heater to said power supply;
    wherein both AC and DC components of said power supply control said heater.

2. The heating device according to claim 1, wherein said dimension is selected to enhance a thermal conductance between said recording head and said recording medium.

3. The heating device according to claim 1, wherein said dimension comprises a width of said heater.

4. The heating device according to claim 1, wherein said heating device induces a thermal protrusion of between about 40 Å and 120 Å in said magnetic recording head.

5. The heating device according to claim 1, wherein a fly height between said recording head and said recording medium is reduced by an amount corresponding to said thermal protrusion.

6. The heating device according to claim 1, wherein said heating device increases a temperature on said recording medium by about 75 K.

7. The heating device according to claim 1, wherein said heater comprises:
    an electrical resistor for Joule heating.

8. The heating device according to claim 1, wherein said heater comprises:
    an electrical resistor for Joule heating; and
    at least one lead connected to said electrical resistor.

9. A magnetic recording head comprising:
    first and second magnetic pole layers;
    at least one heating device for inducing a thermal protrusion in said recording head and increasing a temperature on a recording medium;
    a power supply for supplying power to said at least one heating device; and
    an electrical circuit which connects said at least one heating device to said power supply;
    wherein both AC and DC components of said power supply control said at least one heating device.

10. The magnetic recording head according to claim 9, wherein said at least one heating device comprises:
    first and second separating layers; and
    a heater between said first and second separating layers, said heater having a dimension selected to induce said thermal protrusion and increase said temperature on said recording medium.

11. The magnetic recording head according to claim 10, wherein said dimension is selected to enhance a thermal conductance between said recording head and a recording medium.

12. The magnetic recording head according to claim 10, wherein said dimension comprises a width of said heater.

13. The magnetic recording head according to claim 10, wherein said first magnetic pole layer comprises at least one member, said at least one heating device being formed adjacent to said at least one member.

14. The magnetic recording head according to claim 10, wherein said at least one heating device is formed between two members of said first magnetic pole layer.

15. The magnetic recording head according to claim 10, wherein said at least one heating device is formed in a pocket of a member of said first magnetic pole layer.

16. The magnetic recording head according to claim 10, wherein the heater comprises a member of said first magnetic pole layer.

17. The magnetic recording head according to claim 10 further comprising:
a plurality of terminals for making an electrical connection to said recording head.

18. The magnetic recording head according to claim 17, wherein said plurality of terminals comprises less than seven terminals.

19. The magnetic recording head according to claim 10, wherein said dimension is selected for simultaneous performance of thermally-induced protrusion and thermally-assisted recording.

20. The magnetic recording head according to claim 10 further comprising:
a power supply for simultaneous performance of thermally-induced protrusion and thermally-assisted recording.

21. The magnetic recording head according to claim 10 wherein said heater comprises a width in a range of about 1 to about 10 μm.

22. A magnetic recording head comprising:
first and second magnetic pole layers;
a first heating device for inducing a thermal protrusion in said recording head;
a second heating device for increasing a temperature on a recording medium;
a power supply for supplying power to said first and second heating devices; and
an electrical circuit which connects each of said first and second heating devices to said power supply;
wherein both AC and DC components of said power supply control at least one of said first heating device and said second heating device.

23. The magnetic recording head according to claim 22, wherein said first heating device enhances a thermal conductance between said magnetic recording head and said recording medium.

24. The magnetic recording head according to claim 22 further comprising:
a write gap formed on a trailing edge side of said first magnetic pole layer.

25. The magnetic recording head according to claim 24, wherein said thermal protrusion occurs at said write gap.

26. The magnetic recording head according to claim 22, wherein a DC component of said power supply controls at least one of said first heating device and said second heating device.

27. The magnetic recording head according to claim 22, wherein an AC component of said power supply controls at least one of said first heating device and said second heating device.

28. The magnetic recording head according to claim 22, wherein said electrical circuit comprises at least one capacitor.

29. The magnetic recording head according to claim 28, wherein said at least one capacitor comprises at least one lead.

30. The magnetic recording head according to claim 22, wherein said electrical circuit comprises at least one inductor.

31. The magnetic recording head according to claim 22, wherein a frequency of said power supply controls a division of power between said first and second heating devices.

32. The magnetic recording head according to claim 22, wherein an amplitude of said power supply is adjusted to adjust a total amount of power to said first and second heating devices.

33. The magnetic recording head according to claim 22, wherein said thermal protrusion increases said thermal conductance between said recording head and said recording medium.

34. The magnetic recording head according to claim 22, further comprising:
a capacitor connected to said first and second heating devices, said capacitor comprising:
first and second plates formed of first and second leads, respectively; and
a dielectric material formed between said first and second leads.

35. The magnetic recording head according to claim 34, wherein said second heating device is independently controlled with a DC and AC current/voltage, and said first heating device is controlled with an AC current/voltage.

36. The magnetic recording head according to claim 35, wherein an amount of thermal protrusion is controlled by controlling an amplitude of said AC current.

37. The magnetic recording head according to claim 35, wherein one high frequency component powers both of said first and second heating device, and wherein a power division between said first and second heating devices is primarily determined by an AC power supply frequency.

38. The magnetic recording head according to claim 22, further comprising:
a first capacitor connected in series with said second heating device; and
a second capacitor connected in parallel with said first heating device.

39. The magnetic recording head according to claim 22, further comprising:
five terminals for connecting said recording head to said power supply, one of said terminals comprising a heater terminal, and one of said terminals comprising a terminal which is shared between said first heating device and a write coil.

40. A hard disk drive including the magnetic recording head according to claim 22, said disk drive comprising:
a spindle and motor for rotating a magnetic disk; and
an arm comprising a suspension and said magnetic recording head, for selectively locating said magnetic recording head over said magnetic disk.

* * * * *